June 30, 1959 J. M. MARKLEY Re. 24,663

MOTOR OPERATED VALVES

Original Filed May 10, 1950 2 Sheets-Sheet 1

INVENTOR.
JOSEPH M. MARKLEY
BY H. G. Manning
ATTORNEY

MOTOR OPERATED VALVES

Original Filed May 10, 1950 2 Sheets-Sheet 2

INVENTOR.
JOSEPH M. MARKLEY
BY H. G. Manning
ATTORNEY

United States Patent Office

Re. 24,663

Reissued June 30, 1959

24,663

MOTOR OPERATED VALVES

Joseph M. Markley, Plantsville, Conn., assignor to New England Gear Works, Southington, Conn., a partnership of Connecticut, consisting of Myron D. Markley, Meriden, Conn., and said Joseph M. Markley Original No. 2,723,830, dated November 15, 1955, Serial No. 161,170, May 10, 1950. Application for reissue November 14, 1956, Serial No. 622,232

1 Claim. (Cl. 251—134)

Matter enclosed in heavy brackets [ ] appears in the original patent but forms no part of this reissue specification; matter printed in italics indicates the additions made by reissue.

This invention relates to motor-operated fluid valves and more particularly to a mechanism for electrically controlling the operation of the valve from a remote point.

One object of this invention is to provide a device of the above nature in which a light-duty motor may be utilized for opening or closing a relatively large valve rapidly and efficiently.

Another object is to provide a valve-operating mechanism which may be readily applied to existing valves of the type having a slidable, spring-pressed, operating stem.

Another object is to provide a device of the above nature having a valve opening cam which is so arranged as to permit proper seating of the valve disk, even though said disk may have become worn or mutilated.

Another object is to provide a device of the above nature in which the operating motor will be permitted a substantial amount of overtravel without adversely affecting the fully opened and closed positions of the valve.

A further object is to provide a device of the above nature which will be simple in construction, inexpensive to manufacture, easy to install and manipulate, ornamental in appearance, and very efficient and durable in use.

With these and other objects in view, there has been illustrated on the accompanying drawing, one form in which the invention may conveniently be embodied in practice.

Figure 1:
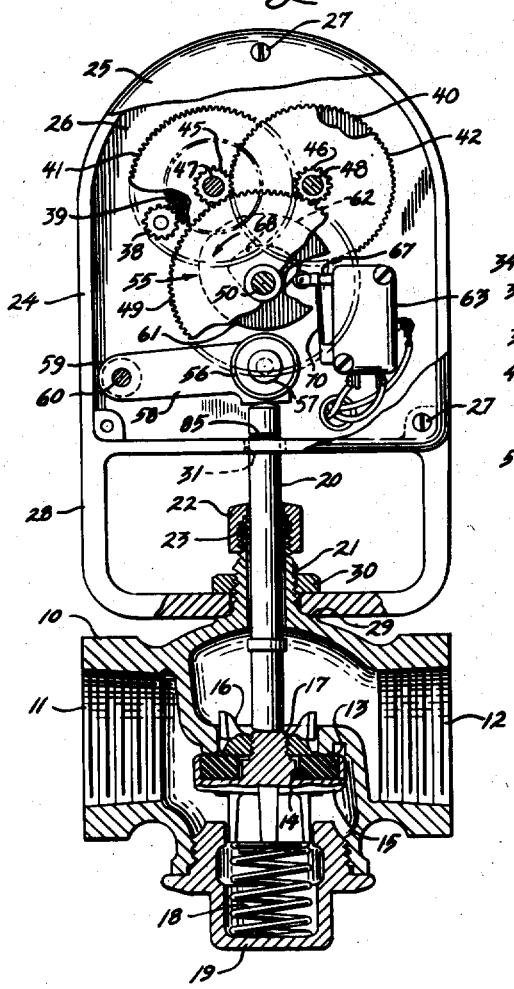
Fig. 1 is a front view of the improved motor-operated valve mechanism shown partly in section and partly broken away to illustrate the parts as they would appear when the valve is closed.

Referring now to the drawing, in which like reference numerals denote corresponding parts throughout the several views, the numeral 10 indicates a valve body having opposite tapped inlet and outlet openings 11, 12 and an intermediate circular valve seat 13 disposed in a plane at right angles to said openings. The valve body 10 preferably is marked with an arrow 13a (Fig. 5) to indicate the proper direction of flow through the valve, thus facilitating installation of the valve operating mechanism.

Fluid flow between the inlet and outlet openings 11, 12 is controlled by a yieldable valve disk 14 which is retained in a cup-shaped holder 15 by a nut 16 on an upstanding central stud 17 in said holder, and which is adapted to be pressed upwardly against the valve seat 13 by a coil spring 18 held in a hollow plug 19 closing the bottom of the valve body 10.

In order to separate the valve disk 14 from the seat 13 (Fig. 4) and thus permit fluid flow through the valve, provision is made of a slidable valve stem 20 which is aligned with and engages the stud 17 within the body 10, the upper portion of said valve stem 20 extending outwardly through a threaded neck 21 on said body. Outward leakage of fluid around the valve stem 20 is prevented by means of a suitable packing 23 retained by a nut 22 on the end of the neck 21.

Mechanism for mechanically operating the valve stem 20 is contained in a casing 24 which comprises detachable front and back bearing plates 25, 26 held upon said casing by screws 27, and a downwardly extending centrally apertured yoke 28 integral with said casing. The yoke 28 embraces the valve neck 21 and is clamped against a flat annular surface 29 on the valve body 10 at the base of said neck by means of a nut 30. When the casing and the valve are assembled in this manner, the upper end of the valve stem 20 projects into the casing 24 through an aperture 31 in the bottom thereof, so that said stem may be operated by mechanism now to be described. Since the yoke 28 is attached to the valve body 10 concentrically with the stem 20, it will be seen that the casing 24 may be rotatively adjusted as desired, either during installation or thereafter.

Figure 2:
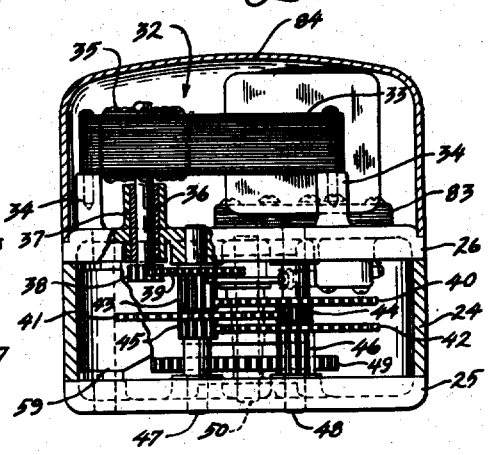
Fig. 2 is a plan view of the same, partly in section.

The valve operating mechanism is adapted to be driven by a motor 32 (Fig. 2) which comprises a stator 33 mounted in a horizontally extending position upon a plurality of posts 34 on the outer surface of the bearing plate 26. The driving motor 32 also includes a rotor 35 which is embraced by the stator 33 and which has a horizontal shaft 36 extending into the interior of the casing 24 through a bearing 37 in the bearing plate 26.

The inner end of the rotor shaft 36 is provided with a pinion 38 for driving a speed-reducing gear train comprising successive gears 39, 40, 41 and 42 having respective pinions 43, 44, 45 and 46 attached thereto, said gears being arranged in overlapping alternate arrangement and freely rotatable upon a pair of horizontal shafts 47, 48 supported by the bearing plates 25, 26.

In order to facilitate assembly of the operating mechanism, the horizontal shafts 47, 48 preferably have press fits in apertures in the front bearing plate 25 so as to be securely attached at one end to said plate, while the opposite ends of said shafts are slidably supported in apertures in the back bearing plate 26.

The final pinion 46 of the gear train is meshed with a relatively large gear 49 fixed upon a camshaft 50, the latter being mounted at its ends in ball bearings 51, 52 held in recesses 53, 54 at central locations in the inner surfaces of the bearing plates 25, 26.

The camshaft 50 carries a valve-opening plate cam 55 adapted to engage a roller 56 which is located below said cam and which is mounted upon a laterally-extending stud 57 upon the end portion of a vertically swingable arm 58. The bottom of an end portion of the arm 58 engages the upper end surface of the valve stem 20 at a location which is horizontally offset from the roller 56.

Inasmuch as forces of large magnitude may be required to operate the valve stem 20, particularly when the fluid in the valve is under high pressure, the swingable arm 58 is provided with a base portion 59 which is laterally enlarged so as to extend across the plane of the roller 56, and which is mounted at its other end upon a horizontal pivot shaft 60 held at its ends in the opposite bearing plates 25, 26. Thus it will be seen that rotation of the cam 55 will be capable of reciprocating the valve stem 20 efficiently with a minimum of wear upon the parts.

Figure 4:
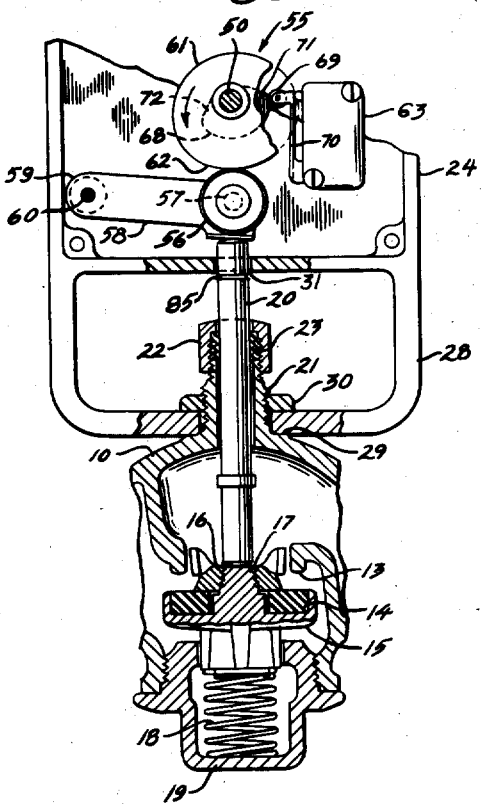
Fig. 4 is a fragmentary sectional front view similar to a portion of Fig. 1, but showing the parts as they would appear when the valve is open.

Referring now to Figs. 1 and 4, it will be seen that the valve-opening plate cam 55 has an eccentric shape which will cause respective opening and closing movements of the valve stem 20 when said cam is rotated through successive steps of 180 degrees in the same direction, the low point or minimum radius of said cam 55 preferably occurring at approximately mid-point of an eccentric edge portion 61 which extends at least half way around the periphery of the cam.

Further, the minimum radius of the eccentric cam portion 61 is such that a substantial clearance will occur between the low point of said cam 55 and the cam follower or roller 56 when the valve disk 14 is in closed position, thus avoiding any interference with complete closing of the valve and insuring that the valve disk 14 will seat properly even though said disk may have become worn or deformed because of prolonged use.

It will also be noted that the clearance which is permitted between the low point of the cam 55 and the roller 56 will allow overtravel of the driving motor 32 when the valve disk 14 reaches closed position without causing the disk 14 to start an opening movement.

In order to permit overtravel of the driving motor 32 when the valve disk 14 reaches a fully open position, the maximum radius of the valve opening cam 55 is provided by a concentric high portion 62 which extends over a substantial part of the periphery of the cam.

In view of the above, it will be understood that the driving motor 32 may continue to rotate for substantial periods of time after the valve disk 14 has reached fully closed and fully opened positions without causing any additional movement of said disk, and without interfering in any way with the proper action of the valve closing spring.

In order to adapt the driving motor 32 to automatic control from an external source, provision is made of a snap-action double-throw limit switch 63 of any suitable type having a pair of contacts 64, 65 (Fig. 6) which are alternatively engageable by a contact arm 66 provided with an external operating button 67. The operating button 67 is adapted to be moved by a limit cam 68 which is fixed upon the cam shaft 50, and which acts upon said button through an anti-friction roller 69 mounted on an intermediate spring arm 70 attached externally to the limit switch 63.

The periphery of the limit cam 68 comprises inwardly and outwardly inclined cam portions 71, 72 which are so located as to operate the limit switch 63 in opposite directions as the valve disk 14 reaches open and closed positions, respectively.

Figure 6:
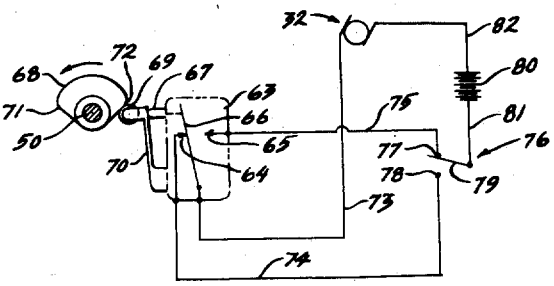
Fig. 6 is a wiring diagram showing one manner in which the motor and the switch may be connected to an external control means.

As illustrated diagrammatically in Fig. 6, the limit switch arm 66 is electrically connected directly to the driving motor 32 by means of an insulated wire 73. The limit switch contacts 64, 65 may, for example, be independently connected by means of insulated wires 74, 75 to respective contacts 77, 78 of a suitable thermostatic or other control switch 76 which may be located at a remote point and which comprises a switch arm 79 for selectively engaging said contacts. The switch arm 79 will, of course, be connected to the driving motor 32 in series with a source of current 80 by means of wires 81, 82.

Figure 5:
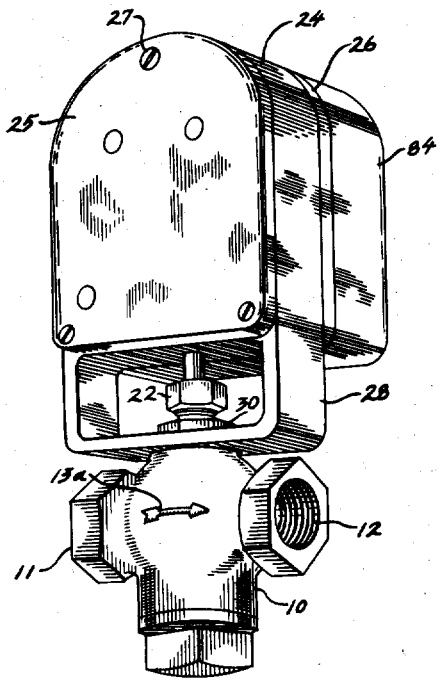
Fig. 5 is a perspective view of the improved motor-operated valve.

The outer face of the bearing plate 26 carries a terminal block 83 (Fig. 2) which will facilitate the operation of connecting the motor operated valve mechanism to the external wires 74, 75 and 82 during installation. The driving motor 32 and the terminal block 83 are preferably enclosed by a removable side cover 84 which is adapted to seat at its edges against the bearing plate 26 (Fig. 5).

In order to furnish a means for visually indicating the position of the valve disk 14 at any time, the valve stem 20 is provided with a peripheral index groove 85 which is so located adjacent the upper end of said stem as to be visible within the yoke 28 below the casing 24 only when the stem 20 is depressed and the disk 14 is in open position.

OPERATION

In use, the valve will first be inserted in the fluid line which is to be controlled by connecting the proper pipes to the inlet and outlet openings 11, 12. The arrow 13a will, of course, indicate to the installer the proper direction of flow so that he may avoid a reversed relationship of the valve to the connecting pipes.

If it is desired to adjust the casing rotatively with respect to the valve body 10 because of space requirements, or for other reasons, this may be done after loosening the yoke clamping nut 30.

The wires 74, 75 and the wire 82 will then be employed to connect the limit switch 63 and the driving motor 32 to the remote control switch 76 and the source of current 80 respectively.

It will usually be important to know whether the valve is in open or closed condition before it is placed in service and this condition will be determined merely by observing the position of the index mark 85 on the valve stem 20.

When the apparatus is in condition for operation, engagement of the control switch arm 79 with the contact 77 or 78 will establish a circuit through the limit switch 63, the motor 32, and the source of current 80, thus causing the valve disk 14 to open or close with respect to the valve seat 13, as the case may be. If, for example, the valve is closed (as indicated by the positions of the parts in Figs. 1, 3 and 6), movement of the control switch arm 79 against the contact 78 will energize the motor 32, thus rotating the valve opening cam 55 which will depress the arm 58 and the valve stem 20 so as to separate the valve disk 14 from the seat 13. When the valve disk 14 reaches fully open position, the cam follower or roller 56 will ride onto the concentric high portion 62 of the cam 55 so that no further movement of the valve disk 15 will occur, and at the same time the roller 69 will be deflected by the outwardly inclined portion 71 of the limit cam 68, thus transferring the limit switch arm 66 from the contact 64 to the contact 65 and deenergizing the driving motor 32. Any further incidental rotation of the motor 32 due to its momentum will produce no further movement of the valve disk 14, inasmuch as the concentric cam portion 62 is of sufficient extent to avoid such movement.

The parts will now occupy the positions illustrated in Fig. 4, and if the control switch arm 79 is now shifted from the contact 78 to the contact 77, the driving motor 32 will again be energized and will resume rotation in the same direction as formerly. This will cause the cam roller 56 to ride off of the high cam portion 62 and onto the low eccentric portion 61 of the valve-opening cam 55, thus permitting the valve spring 18 to close the valve disk 14 against the seat 13.

Figure 3:
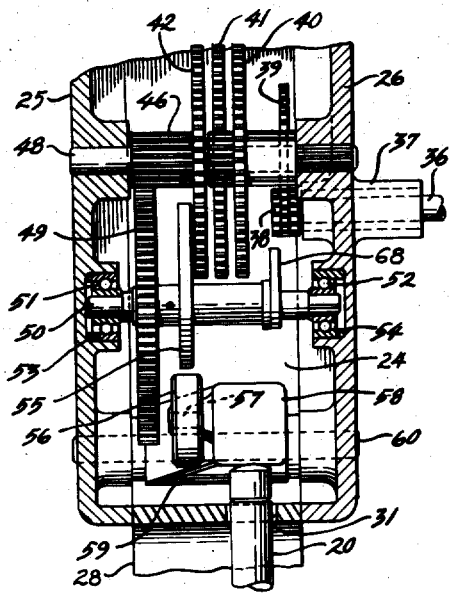
Fig. 3 is a fragmentary vertical sectional view of the same on a larger scale.
Figure 7:
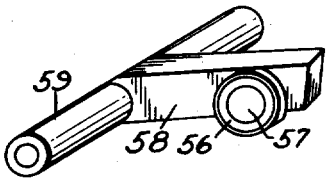
Fig. 7 is a perspective view of the swingable stem actuating roller, the stud and the laterally extending pivot bearing sleeves.

At the time the disk 14 engages the seat 13, or slightly thereafter, the inwardly inclined portion 72 of the limit cam 68 will release the anti-friction roller 69 so as to permit the switch arm 66 to shift from the contact 65 to the contact 64, thus deenergizing the motor 32. Any further rotation of the motor 32 due to its momentum will have no effect upon the closed position of the valve disk 14 inasmuch as the valve opening cam 55 will now be separated from the cam follower 56 (as shown in Figs. 1 and 3), thus providing a clearance which will permit the valve spring 18 to take full effect for seating the valve disk 14.

The motor operated valve herein disclosed has been found to be dependable and capable of controlling very high fluid pressures because of its durable construction and the high mechanical advantage through which the motor acts upon the valve stem.

Another advantage is that the casing 24 may be readily removed from the valve body 10 without opening the valve body or disturbing the connections of the pipes thereto. Thus, the casing 24 may be removed or replaced without any substantial interruption of service in the fluid line.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a motor driven fluid control valve comprising a valve biased to closed position in a housing, a casing mounted on said housing, an operating stem connected to said valve and extending into said casing, a motor driven gear train in said casing, a rotatable cam having high and low points driven by said gear train, a stem-operating arm connected at one end to a pivot shaft mounted in said casing and having on its other end a lateral member comprising a [ball bearing] follower mounted on a stud offset from said arm, said follower being aligned with said cam and adapted to contact therewith, a portion of said cam having a clearance from said roller when said valve is closed to permit overtravel of the motor while said valve remains properly seated, said arm also having a pair of enlarged lateral sleeve bearings surrounding said pivot shaft, and a second cam fixed for rotation with said first cam and spaced therefrom and operating a switch in an energizing circuit for the motor to shut off said motor after a predetermined operation of said valve.

References Cited in the file of this patent or the original patent

UNITED STATES PATENTS

| | | |
|---|---|---|
| 1,279,650 | Bungay | Sept. 24, 1918 |
| 1,319,502 | Wright | Oct. 21, 1919 |
| 1,482,774 | Wills | Feb. 5, 1924 |
| 1,839,483 | Humphrey | Jan. 5, 1932 |
| 1,849,274 | Brown | Mar. 15, 1932 |
| 1,855,647 | Pottenger | Apr. 26, 1932 |
| 1,875,672 | Stewart | Sept. 6, 1932 |
| 1,903,229 | Colman et al. | Mar. 28, 1933 |
| 1,903,230 | Stewart | Mar. 28, 1933 |
| 1,966,336 | Dewey | July 10, 1934 |
| 1,989,942 | Parks | Feb. 5, 1935 |
| 2,039,300 | Drake | May 5, 1936 |
| 2,119,084 | McQuiston | May 31, 1938 |
| 2,184,701 | Kreitchbaum | Dec. 26, 1939 |
| 2,205,512 | Anderson | June 25, 1940 |
| 2,229,499 | Fisette | Jan. 21, 1941 |
| 2,437,552 | Quiroz | Mar. 9, 1948 |
| 2,456,403 | Goehring | Dec. 14, 1948 |
| 2,630,832 | Lutherer | Mar. 10, 1953 |

FOREIGN PATENTS

| | | |
|---|---|---|
| 891,515 | France | Dec. 11, 1943 |